United States Patent
Hayashi (10) Patent No.: US 11,264,919 B2
(45) Date of Patent: Mar. 1, 2022

(54) INVERTER CIRCUIT, INVERTER CIRCUIT CONTROL METHOD, CONTROL DEVICE, AND LOAD DRIVE DEVICE

(71) Applicant: SHINDENGEN ELECTRIC MANUFACTURING CO., LTD., Tokyo (JP)

(72) Inventor: Masaaki Hayashi, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/982,746

(22) PCT Filed: Jun. 7, 2019

(86) PCT No.: PCT/JP2019/022673
§ 371 (c)(1),
(2) Date: Sep. 21, 2020

(87) PCT Pub. No.: WO2019/235606
PCT Pub. Date: Dec. 12, 2019

(65) Prior Publication Data
US 2021/0075340 A1    Mar. 11, 2021

(30) Foreign Application Priority Data
Jun. 7, 2018 (JP) .............................. JP2018-109522

(51) Int. Cl.
*H02M 7/539* (2006.01)
*H02M 1/08* (2006.01)
*H02M 3/335* (2006.01)

(52) U.S. Cl.
CPC ............. *H02M 7/539* (2013.01); *H02M 1/08* (2013.01); *H02M 3/33523* (2013.01)

(58) Field of Classification Search
CPC ..... H02M 7/539; H02M 1/08; H02M 3/33523
(Continued)

(56) References Cited

U.S. PATENT DOCUMENTS

| | | | | |
|---|---|---|---|---|
| 8,213,192 B2* | 7/2012 | Konecny | ........... | H02M 3/33515 363/21.13 |
| 2003/0147264 A1* | 8/2003 | Jinno | ................ | H02M 3/33592 363/20 |
| 2017/0149339 A1* | 5/2017 | Kawashima | ...... | H02M 3/33515 |

FOREIGN PATENT DOCUMENTS

| | | |
|---|---|---|
| JP | H07-312866 A | 11/1995 |
| JP | H10-191630 A | 7/1998 |

(Continued)

OTHER PUBLICATIONS

International Application No. PCT/JP2019/022673, International Preliminary Reporton Patentability, dated Dec. 17, 2020.
(Continued)

*Primary Examiner* — Yemane Mehari
(74) *Attorney, Agent, or Firm* — Marshall, Gerstein & Borun LLP (57) ABSTRACT

[Problem] An object is to provide an inverter circuit that can improve the efficiency and stabilize the operation, the inverter circuit executes normal control when the output voltage rises, even when the output frequency is low, and the inverter circuit divides the normal control and regenerative control operations so that the regenerative control is executed when the output voltage drops.
[Solution] When the error value is greater than or equal to the first threshold value, the control unit of the inverter circuit executes a normal control of the capacitive load, by operating the primary side switch with the secondary side switch turned off, and on the other hand, when the error value is less than the first threshold value, the control unit executes a regenerative control to the direct current power
(Continued)

supply, by operating the secondary side switch with the primary side switch turned off.

15 Claims, 3 Drawing Sheets

(58) Field of Classification Search
USPC .......................................................... 363/131
See application file for complete search history.

(56) References Cited

FOREIGN PATENT DOCUMENTS

| | | |
|---|---|---|
| JP | 2003-234517 A | 8/2003 |
| JP | 2007-049890 A | 2/2007 |
| JP | 2009-225579 A | 10/2009 |

OTHER PUBLICATIONS

International Application No. PCT/JP2019/022673, International Search Report, dated Aug. 20, 2019.

* cited by examiner

INVERTER CIRCUIT, INVERTER CIRCUIT CONTROL METHOD, CONTROL DEVICE, AND LOAD DRIVE DEVICE

CROSS REFERENCE TO RELATED APPLICATIONS

This application is the U.S. national phase of PCT Application No. PCT/JP2019/022673, filed on Jun. 7, 2019, which claims priority to Japanese Application No. 2018-109522, filed Jun. 7, 2018, the entire disclosures of which are hereby incorporated by reference in their entirety.

TECHNICAL FIELD

The present invention relates to an inverter circuit, an inverter circuit control method, a control device, and a load drive device.

BACKGROUND ART

Conventionally, for example, an inverter circuit adopting a non-insulated flyback regenerative control method is known (see, for example, Patent Documents 1 and 2).

In such a conventional inverter circuit, the switch for normal control and the switch for regenerative control are switched even in unnecessary parts, the operation of these switches is not separated, and there is a problem that efficiency is reduced.

PRIOR ART DOCUMENTS

Patent Literature

[Patent Document 1] JP A 2003-234517
[Patent Document 2] JP A 2007-049890

DISCLOSURE OF THE INVENTION

Problem to be Solved by the Invention

Therefore, an object of the present invention is to provide an inverter circuit that can improve the efficiency and stabilize the operation, the inverter circuit executes normal control when the output voltage rises, even when the output frequency is low, and the inverter circuit divides the normal control and regenerative control operations so that the regenerative control is executed when the output voltage drops.

Solution to Problem

An inverter circuit, being a flyback regenerative control type inverter circuit for driving a capacitive load, according to an embodiment according to an aspect of the present invention, the inverter circuit includes:

a first input power supply terminal and a second input power supply terminal to which a direct current voltage is supplied from a direct current power supply;

a first output power supply terminal connected to one end of the capacitive load, and a second output power supply terminal connected to the other end of the capacitive load;

a primary coil having one end connected to the first input power terminal;

a primary side switch having one end connected to the other end of the primary side coil, and having the other end connected to the second input power supply terminal;

a primary side rectifying element having one end connected to one end of the primary side switch, and having the other end connected to the other end of the primary side switch;

a secondary coil having one end connected to the first output power supply terminal, and the secondary coil forming a transformer with the primary coil;

a secondary side switch having one end connected to the other end of the secondary coil, and having the other end connected to the second output power supply terminal;

a secondary side rectifying element having one end connected to one end of the secondary side switch, and having the other end connected to the other end of the secondary side switch;

a voltage dividing circuit that outputs a feedback signal based on a divided voltage obtained by dividing an output voltage between the first output power supply terminal and the second output power supply terminal; and a control unit that controls the primary side switch and the secondary side switch, based on a comparison result of comparing an error value and a preset first threshold value, the error value between the feedback signal and an input signal defining the target voltage of the output voltage.

In the inverter circuit, wherein, when the error value is greater than or equal to the first threshold value, the control unit executes a normal control of the capacitive load, by operating the primary side switch with the secondary side switch turned off, and On the other hand, when the error value is less than the first threshold value, the control unit executes a regenerative control to the direct current power supply, by operating the secondary side switch with the primary side switch turned off.

In the inverter circuit, wherein, when the error value is lower than a preset second threshold value lower than the first threshold value, the control unit controls an ON width of the secondary side switch to become longer when the error value becomes lower, and controls so that switching period of the secondary side switch becomes fixed.

In the inverter circuit, wherein, when the error value is between a preset third threshold value, lower than the first threshold value and higher than the second threshold value, and the second threshold value, the control unit fixes the ON width of the secondary side switch to the minimum ON width, and controls so that the switching period of the secondary side switch becomes longer as the error value becomes higher.

In the inverter circuit, wherein, when the error value is higher than a preset fourth threshold value higher than the first threshold value, the control unit controls the ON width of the primary side switch to become longer when the error value becomes higher, and controls so that the switching period of the primary side switch becomes fixed.

In the inverter circuit, wherein, when the error value is between the preset fifth threshold value, higher than the first threshold value and lower than the fourth threshold value, and the fourth threshold value, the control unit controls the ON width of the primary side switch to be fixed to the minimum ON width, and controls the switching period of the primary side switch to become longer when the error value becomes lower.

In the inverter circuit, wherein, when the error value is between the third threshold value and the fifth threshold value, the control unit controls the primary side switch and the secondary side switch to be kept off.

In the inverter circuit, wherein the primary side switch is a first n-type MOS transistor having a drain which is the one end connected to the other end of the primary coil, and having a source which is the other end connected to the second input power supply terminal, wherein the secondary switch is a second n-type MOS transistor having a drain which is the one end connected to the other end of the secondary coil and the source which is the other end connected to the second output power supply terminal, wherein the primary side rectifying element is a first diode having a cathode connected to the one end of the primary side switch, and having an anode connected to the other end of the primary side switch, and wherein the secondary rectifying element is a second diode having a cathode connected to the one end of the secondary switch, and having an anode connected to the other end of the secondary switch.

In the inverter circuit, wherein the control unit comprises:

an error amplifier having an inverting input terminal to which the feedback signal is input, having a non-inverting input terminal to which the input signal is input, and outputting an error value between the feedback signal and the input signal;

a primary side ON width control circuit outputting a first signal that defines an ON width for operating the primary side switch, based on the error value;

a secondary-side ON width control circuit outputting a second signal that defines an ON width for operating the secondary-side switch, based on the error value; and a switching period control circuit that outputs a third signal that defines a frequency at which the primary side switch and the secondary side switch are operated, based on the error value;

wherein the control unit controls the primary side switch and the secondary side switch based on the first to third signals.

In the inverter circuit, wherein the control unit further comprises:

a primary/secondary switching circuit that outputs a fourth signal for switching one of the primary side switch and the secondary side switch to be operated, based on the error value; and a switch cutoff circuit that outputs a fifth signal for forcibly turning off the primary side switch and the secondary side switch, wherein the control unit controls the primary side switch and the secondary side switch based on the first to fifth signals.

In the inverter circuit, wherein the control unit further comprises:

a first logic circuit that outputs a first gate control signal for controlling the primary side switch, based on the first, third, fourth, and fifth signals; and a second logic circuit that outputs a second gate control signal for controlling the secondary side switch, based on the second, third, fourth, and fifth signals.

In the inverter circuit, wherein the first logic circuit comprises:

a first flip-flop circuit having a set terminal to which the third signal is input, and having a reset terminal to which the first signal is input;

an inverter element to which the fourth signal is input;

a first AND circuit that receives a signal output from the output of the first flip-flop circuit, a signal output from the inverter element, and the fifth signal;

a first buffer that receives the signal output from the first AND circuit, and outputs a first gate control signal for controlling the primary side switch;

wherein the second logic circuit comprises:

a second flip-flop circuit having a set terminal to which the third signal is input and a reset terminal to which the second signal is input;

a second AND circuit that receives the signal output from the second flip-flop circuit, the fourth signal, and the fifth signal; and a second buffer that receives a signal output from the second AND circuit, and outputs a second gate control signal for controlling the secondary switch.

A control device, according to an embodiment according to an aspect of the present invention, applied to an inverter circuit, being a flyback regenerative control type inverter circuit for driving a capacitive load, wherein the inverter circuit includes: a first input power supply terminal and a second input power supply terminal to which a direct current voltage is supplied from a direct current power supply; a first output power supply terminal connected to one end of the capacitive load, and a second output power supply terminal connected to the other end of the capacitive load; a primary coil having one end connected to the first input power terminal; a primary side switch having one end connected to the other end of the primary side coil, and having the other end connected to the second input power supply terminal; a primary side rectifying element having one end connected to one end of the primary side switch, and having the other end connected to the other end of the primary side switch; a secondary coil having one end connected to the first output power supply terminal, and the secondary coil forming a transformer with the primary coil; a secondary side switch having one end connected to the other end of the secondary coil, and having the other end connected to the second output power supply terminal; a secondary side rectifying element having one end connected to one end of the secondary side switch, and having the other end connected to the other end of the secondary side switch; and a voltage dividing circuit that outputs a feedback signal based on a divided voltage obtained by dividing an output voltage between the first output power supply terminal and the second output power supply terminal; and a control unit that controls the primary side switch and the secondary side switch, based on a comparison result of comparing an error value and a preset first threshold value, the error value between the feedback signal and an input signal defining the target voltage of the output voltage, the control device controls the primary side switch and the secondary side switch, based on a comparison result of comparing an error value and a preset first threshold value, the error value between the feedback signal and an input signal defining the target voltage of the output voltage.

An inverter circuit control method for controlling an inverter circuit, according to an embodiment according to an aspect of the present invention, being a flyback regenerative control type inverter circuit for driving a capacitive load, wherein the inverter circuit includes: a first input power supply terminal and a second input power supply terminal to which a direct current voltage is supplied from a direct current power supply; a first output power supply terminal connected to one end of the capacitive load, and a second output power supply terminal connected to the other end of the capacitive load; a primary coil having one end connected to the first input power terminal; a primary side switch having one end connected to the other end of the primary side coil, and having the other end connected to the second input power supply terminal; a primary side rectifying element having one end connected to one end of the primary side switch, and having the other end connected to the other end of the primary side switch; a secondary coil having one end connected to the first output power supply terminal, and the secondary coil forming a transformer with the primary coil; a secondary side switch having one end connected to the other end of the secondary coil, and having the other end connected to the second output power supply terminal; a secondary side rectifying element having one end connected to one end of the secondary side switch, and having the other end connected to the other end of the secondary side switch; and a voltage dividing circuit that outputs a feedback signal based on a divided voltage obtained by dividing an output voltage between the first output power supply terminal and the second output power supply terminal, wherein, when the error value is greater than or equal to the first threshold value, the control unit executes a normal control of the capacitive load, by operating the primary side switch with the secondary side switch turned off, and on the other hand, when the error value is less than the first threshold value, the control unit executes a regenerative control to the direct current power supply, by operating the secondary side switch with the primary side switch turned off.

A load drive device, according to an embodiment according to an aspect of the present invention, includes:

a direct current power supply outputting a direct current voltage;

a capacitive load; and an inverter circuit, being a flyback regenerative control type inverter circuit for driving the capacitive load, wherein the inverter circuit comprises:

a first input power supply terminal and a second input power supply terminal to which the direct current voltage is supplied from the direct current power supply;

a first output power supply terminal connected to one end of the capacitive load, and a second output power supply terminal connected to the other end of the capacitive load;

a primary coil having one end connected to the first input power terminal;

a primary side switch having one end connected to the other end of the primary side coil, and having the other end connected to the second input power supply terminal;

a primary side rectifying element having one end connected to one end of the primary side switch, and having the other end connected to the other end of the primary side switch;

a secondary coil having one end connected to the first output power supply terminal, and the secondary coil forming a transformer with the primary coil;

a secondary side switch having one end connected to the other end of the secondary coil, and having the other end connected to the second output power supply terminal;

a secondary side rectifying element having one end connected to one end of the secondary side switch, and having the other end connected to the other end of the secondary side switch;

a voltage dividing circuit that outputs a feedback signal based on a divided voltage obtained by dividing an output voltage between the first output power supply terminal and the second output power supply terminal; and a control unit that controls the primary side switch and the secondary side switch, based on a comparison result of comparing an error value and a preset first threshold value, the error value between the feedback signal and an input signal defining the target voltage of the output voltage.

Effects of the Invention

An inverter circuit, being a flyback regenerative control type inverter circuit for driving a capacitive load, according to an embodiment according to an aspect of the present invention, the inverter circuit includes: a first input power supply terminal and a second input power supply terminal to which a direct current voltage is supplied from a direct current power supply; a first output power supply terminal connected to one end of the capacitive load, and a second output power supply terminal connected to the other end of the capacitive load; a primary coil having one end connected to the first input power terminal; a primary side switch having one end connected to the other end of the primary side coil, and having the other end connected to the second input power supply terminal; a primary side rectifying element having one end connected to one end of the primary side switch, and having the other end connected to the other end of the primary side switch; a secondary coil having one end connected to the first output power supply terminal, and the secondary coil forming a transformer with the primary coil; a secondary side switch having one end connected to the other end of the secondary coil, and having the other end connected to the second output power supply terminal; a secondary side rectifying element having one end connected to one end of the secondary side switch, and having the other end connected to the other end of the secondary side switch; a voltage dividing circuit that outputs a feedback signal based on a divided voltage obtained by dividing an output voltage between the first output power supply terminal and the second output power supply terminal; and a control unit that controls the primary side switch and the secondary side switch, based on a comparison result of comparing an error value and a preset first threshold value, the error value between the feedback signal and an input signal defining the target voltage of the output voltage.

Therefore, according to the inverter circuit of the present invention, it is possible to improve the efficiency and stabilize the operation, because the inverter circuit executes normal control when the output voltage rises, even when the output frequency is low, and the inverter circuit divides the normal control operation and the regenerative control operation so that the regenerative control is executed when the output voltage drops.

EMBODIMENTS FOR CARRYING OUT THE INVENTION

Figure 1:
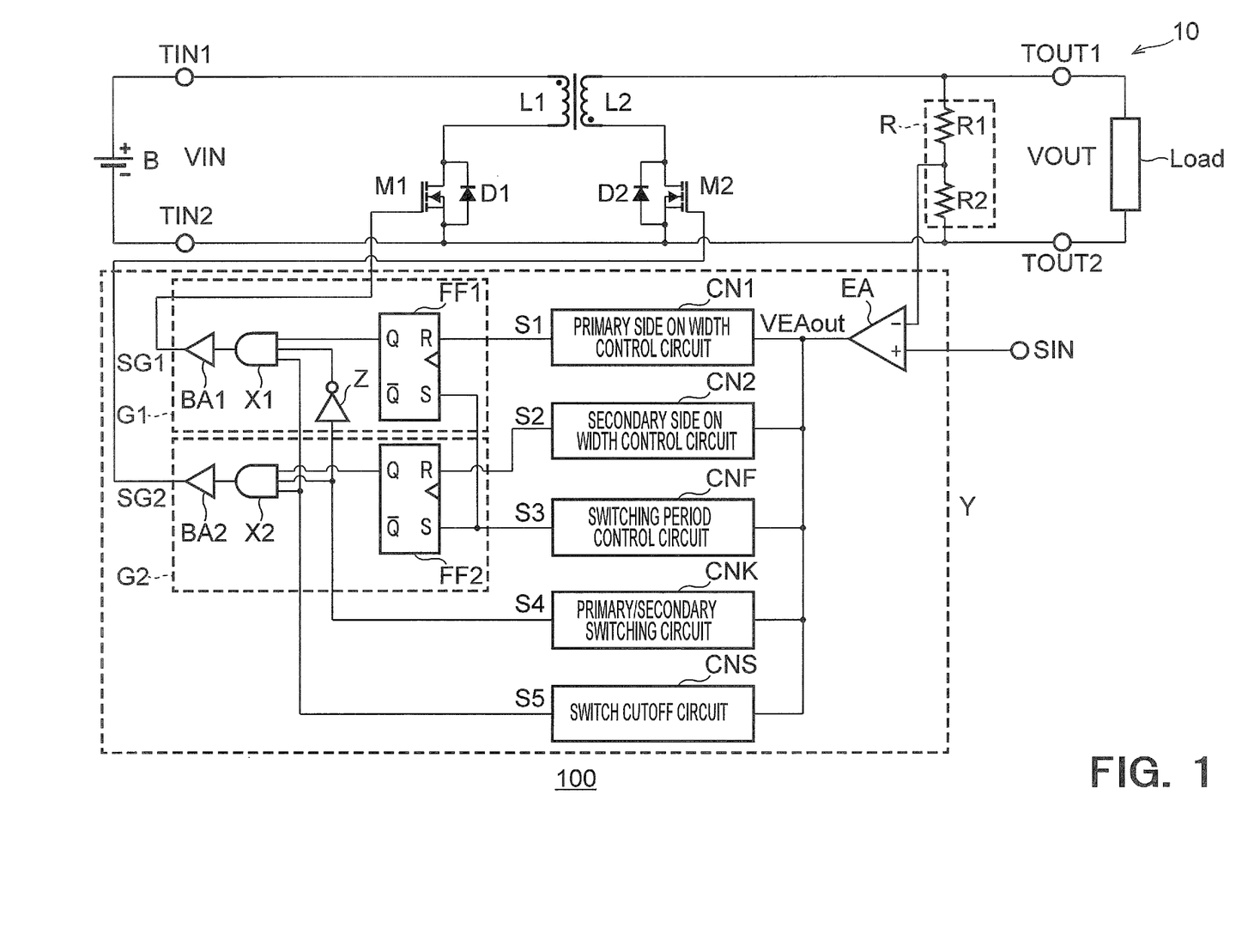
FIG. 1 is a diagram showing an example of a system configuration of a load drive device 100 including an inverter circuit 10 according to the present embodiment.
Figure 2:
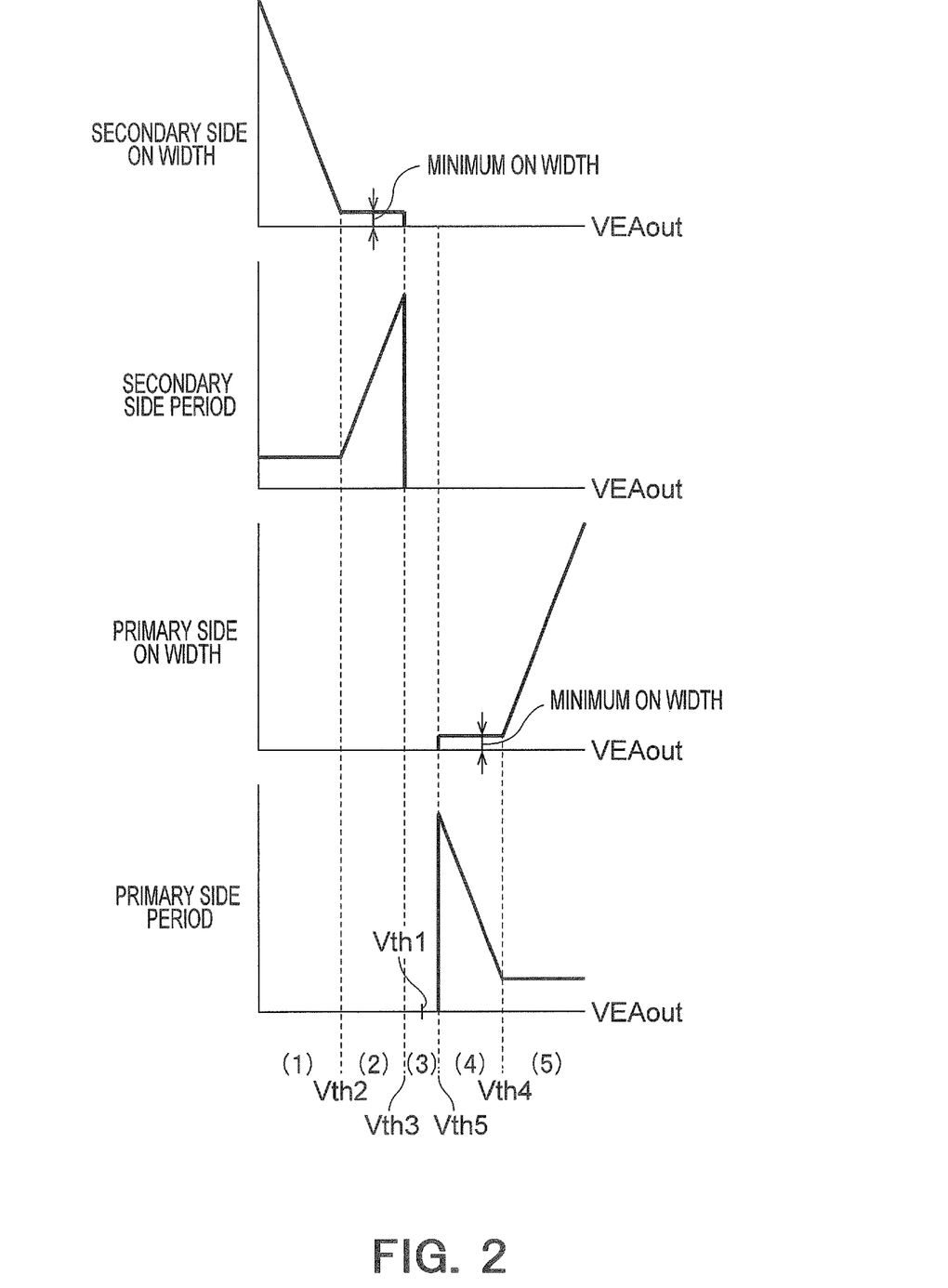
FIG. 2 is a diagram showing an example of respective waveforms of periods and ON widths of the primary side and secondary side switches of the inverter circuit 10 shown in FIG. 1.
Figure 3:
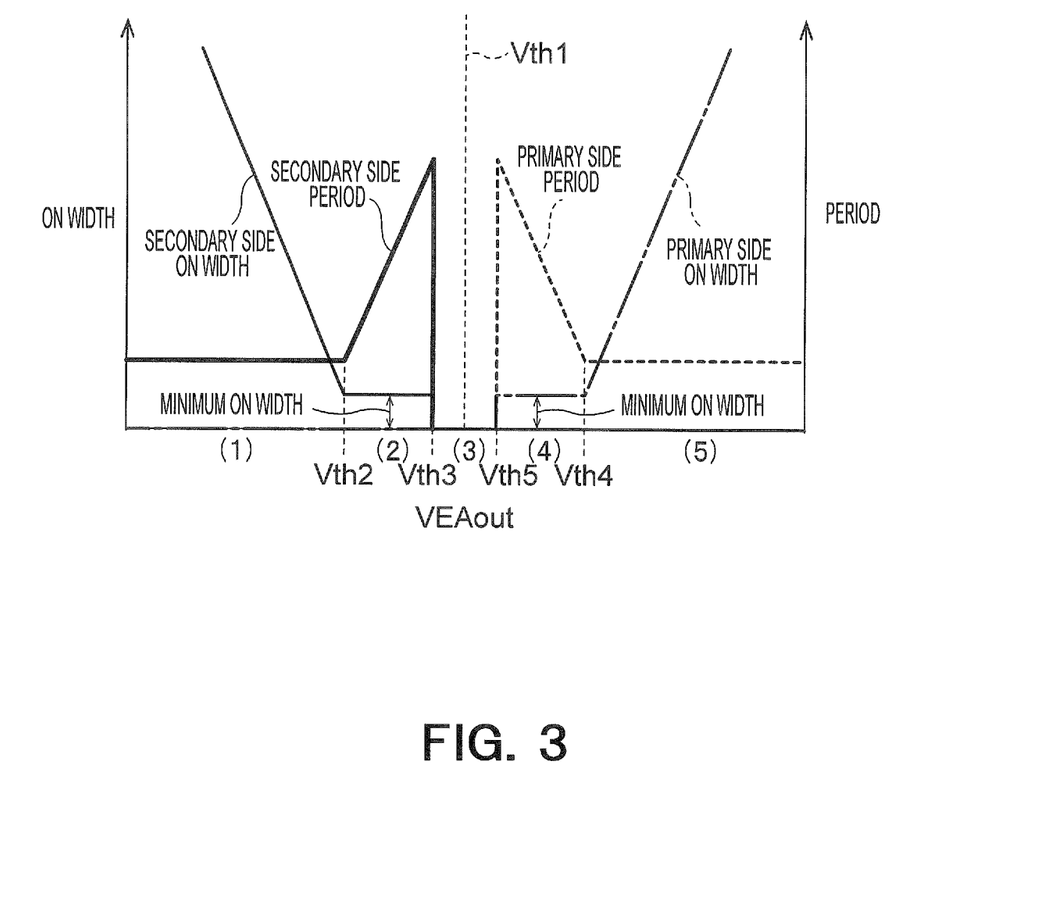
FIG. 3 is a diagram in which each waveform of the period and the ON width of the primary side and secondary side switches of the inverter circuit 10 shown in FIG. 2.

FIG. 1 is a diagram showing an example of a system configuration of a load drive device 100 including an inverter circuit 10 according to the present embodiment. FIG. 2 is a diagram showing an example of respective waveforms of periods and ON widths of the primary side and secondary side switches of the inverter circuit 10 shown in FIG. 1. FIG. 3 is a diagram in which each waveform of the period and the ON width of the primary side and secondary side switches of the inverter circuit 10 shown in FIG. 2.

The load drive device 100 according to the present embodiment includes, for example, as shown in FIG. 1, a direct current power supply B that outputs a direct current voltage VIN, a capacitive load Load, and an inverter circuit 10.

Then, the direct current power supply B outputs the direct current voltage VIN. This direct current power supply B is, for example, as shown in FIG. 1, a battery having a positive electrode connected to the first input power supply terminal TIN1 and having a negative electrode connected to the second input power supply terminal TIN2.

Moreover, the capacitive load Load is, for example, a load of an actuator or the like.

The inverter circuit 10 is a flyback regenerative control type inverter circuit for driving the capacitive load Load based on the direct current voltage VIN.

Here, the inverter circuit 10 includes, for example, as shown in FIG. 1, a first input power supply terminal TIN1, a second input power supply terminal TIN2, a first output power supply terminal TOUT1, a second output power supply terminal TOUT2, a primary coil L1, a primary side switch M1, a primary side rectifying element D1, a secondary side coil L2, a secondary side switch M2, a secondary side rectifying element D2, a voltage dividing circuit R, and a control unit (control device) Y.

The direct-current power supply B supplies a direct-current voltage (an input voltage) VIN to the first input power supply terminal TIN1 and the second input power supply terminal TIN2.

Also, the first output power supply terminal TOUT1 is connected to one end of the capacitive load Load.

The second output power supply terminal TOUT2 is connected to the other end of the capacitive load Load.

Note that, for example, as shown in FIG. 1, the second input power supply terminal TIN2 and the second output power supply terminal TOUT2 are electrically connected and grounded.

Also, one end of the primary coil L1 is connected to the first input power supply terminal TIN1.

Also, the primary side switch M1 has one end connected to the other end of the primary side coil L1, and has the other end connected to the second input power supply terminal TIN2.

For example, as shown in FIG. 1, the primary side switch M1 is a first n-type MOS transistor having a drain which is one end connected to the other end of the primary coil L1, and having a source which is the other end connected to the second input power supply terminal TIN2.

Further, the primary side rectifying element D1 has one end connected to one end of the primary side switch M1, and has the other end connected to the other end of the primary side switch M1.

For example, as shown in FIG. 1, the primary side rectifying element D1 is a first diode having a cathode connected to one end of the primary-side switch M1 and having an anode connected to the other end of the primary-side switch M1.

Also, the secondary coil L2 has one end connected to the first output power supply terminal TOUT1. The secondary coil L2 constitutes a transformer with the primary coil L1.

The secondary switch M2 has one end connected to the other end of the secondary coil L2, and has the other end connected to the second output power supply terminal TOUT2.

For example, as shown in FIG. 1, this secondary side switch M2 is a second n-type MOS transistor having one end connected to the other end of the secondary coil L2, and having the other end connected to the second output power supply terminal TOUT2.

The secondary side rectifying element D2 has one end connected to one end of the secondary switch M2, and has the other end connected to the other end of the secondary switch M2.

For example, as shown in FIG. 1, this secondary side rectifying element D2 is a second diode having a cathode connected to one end of the secondary switch M2, and having an anode connected to the other end of the secondary switch M2.

Further, the voltage dividing circuit R outputs the feedback signal SF based on the divided voltage obtained by dividing the output voltage VOUT between the first output power supply terminal TOUT1 and the second output power supply terminal TOUT2.

For example, as shown in FIG. 1, the dividing circuit R includes a first voltage dividing resistor R1 and a second voltage dividing resistor R2.

The first voltage dividing resistor R1 has one end connected to the first output power supply terminal TOUT1, and has the other end connected to a node that outputs the feedback signal SF.

The second voltage dividing resistor R2 has one end connected to the node that outputs the feedback signal SF, and the other end connected to the second output power supply terminal TOUT2.

Also, the control unit Y controls the primary side switch M1 and the secondary side switch M2, based on the comparison result obtained by comparing the error value VEAout, between the feedback signal SF and the input signal SIN defining the target voltage of the output voltage VOUT, with the preset first threshold value Vth1.

For example, when the error value VEAout is less than the above mentioned first threshold value Vth1 (when the error value VEAout in FIGS. 2 and 3 is in the range of (1) and (2)), the control unit Y is configured to execute the regenerative control to the direct current power source B by operating the secondary side switch M2 (the secondary switch M2 is periodically turned on/off) with the primary switch M1 turned off.

Particularly, when the error value VEAout is lower than the preset second threshold Vth2 lower than the first threshold Vth1 (when the error value VEAout in FIGS. 2 and 3 is in the range of (1)), the control unit Y is configured to control so that the ON width of the secondary side switch M2 becomes longer as the error value VEAout is lower, and control so that the switching period of the secondary side switch M2 is fixed.

Further, when the error value VEAout is between the preset third threshold Vth3, lower than the first threshold Vth1 and higher than the second threshold Vth2, and the second threshold Vth2 (when the error value VEAout in FIGS. 2 and 3 is in the range (2)), the control unit Y controls so that the ON width of the secondary side switch M2 is fixed to the minimum ON width, and controls so that the switching period of the secondary side switch M2 becomes longer as the error value VEAout becomes higher.

On the other hand, when the error value VEAout is higher than or equal to the first threshold value Vth1 described above (when the error value VEAout in FIGS. 2 and 3 is in the range of (4) and (5)), the control unit Y is configured to execute the normal control of the capacitive load Load by operating the primary side switch M1 (the primary side switch M1 is periodically turned on/off) with the secondary side switch M2 turned off.

In particular, when the error value VEAout is higher than the preset fourth threshold Vth4 which is higher than the first threshold Vth1 (when the error value VEAout in FIGS. 2 and 3 is in the range of (5)), the control unit Y controls so that the ON width of the primary side switch M1 becomes longer as the error value VEAout is higher, and controls the primary side switch M1 so that the switching period is fixed.

Furthermore, when the error value VEAout is between the preset fifth threshold value Vth5, higher than the first threshold value Vth1 and lower than the fourth threshold value, and the fourth threshold value Vth4 (when the error value VEAout in FIGS. 2 and 3 is in the range of (4)), the control unit Y controls to fix the ON width of the primary side switch M1 to the minimum ON width, and controls the switching period of the primary side switch M1 so that the switching period of the primary side switch M1 becomes longer as the error value VEAout is lower.

Further, when the error value VEAout is between the third threshold value Vth3 and the fifth threshold value Vth5 (when the error value VEAout in FIGS. 2 and 3 is in the range of (3)), the control unit Y controls the primary side switch M1 and the secondary side switch M2 so as to keep them off.

Here, for example, as shown in FIG. 1, the control unit Y comprises an error amplifier EA, a primary side ON width control circuit CN1, a secondary side ON width control circuit CN2, a switching period control circuit CNF, a primary/secondary switching circuit CNK, a switch cutoff circuit CNS, a first logic circuit G1 and a second logic circuit G2.

The error amplifier EA receives the feedback signal SF at the inverting input terminal and the input signal SIN at the non-inverting input terminal, and outputs the error value VEAout between the feedback signal SF and the input signal SIN.

Further, the primary side ON width control circuit CN1 outputs the first signal S1 which defines the ON width for operating the primary side switch M1, based on the error value VEAout.

Furthermore, the secondary side ON width control circuit CN2 outputs the second signal S2 which defines the ON width for operating the secondary side switch M2, based on the error value VEAout.

Furthermore, the switching period control circuit CNF is outputs a third signal S3 which defines the frequency for operating the primary side switch M1 and the secondary side switch M2, based on the error value VEAout.

Also, the primary/secondary switching circuit CNK outputs a fourth signal S4 for switching to a switch to be operated among the primary side switch M1 and the secondary side switch M2, based on the error value VEAout, Also, the switch cutoff circuit CNS outputs a fifth signal S5 for forcibly turning off the primary side switch M1 and the secondary side switch M2.

Also, the first logic circuit G1 outputs the first gate control signal SG1 for controlling the primary side switch M1 based on the first, third, fourth and fifth signals S1, S3, S4, and S5.

Here, for example, as shown in FIG. 1, the first logic circuit G1 comprises a first flip-flop circuit FF1, an inverter element Z, a first AND circuit X1, and a first buffer BA1.

The first flip-flop circuit FF1 receives the third signal S3 at the set terminal S, receives the first signal S1 at the reset terminal R, and outputs a predetermined signal from the output Q.

Further, the inverter element Z is adapted to receive the fourth signal S4 and output a signal obtained by inverting the fourth signal S4.

Further, the first AND circuit X1 receives the signal output from the output Q of the first flip-flop circuit FF1, the signal output from the inverter element Z, and the fifth signal S5, and outputs a signal obtained by and operation about these signals.

Further, the first buffer BA1 receives the signal output from the first AND circuit X1, and outputs the first gate control signal SG1 for controlling the primary side switch M1

Also, the second logic circuit G2 is adapted to output a second gate control signal SG2 for controlling the secondary side switch M2, based on the second, third, fourth and fifth signals S2, S3, S4, S5.

Here, for example, as shown in FIG. 1, the second logic circuit G2 comprises a second flip flop circuit FF2, a second AND circuit X2, and a second buffer BA2.

Then, the second flip flop circuit FF2 receives the third signal S3 at the set terminal S, receives the second signal S2 at the reset terminal R, and outputs a predetermined signal from the output Q.

Also, the second AND circuit X2 receives the signal output from the output Q of the second flip-flop circuit FF2, the fourth signal S4, and the fifth signal S5, and outputs a signal obtained by the AND operation about these signals.

Also, the second buffer BA2 receives the signal output from the second AND circuit X2, and outputs a second gate control signal SG2 for controlling the secondary side switch M2.

The control unit Y, having such a configuration, controls the operation of the primary side switch M1 and the secondary side switch M2, based on the first to fifth signals S1 to S5 (in particular, the first to third signals S1 to S3).

Next, an example of a control method of the inverter circuit 10 having the above configuration will be described with reference to the drawings.

First, as described above, the error amplifier EA of the control unit Y of the inverter circuit 10 outputs the error value VEAout between the feedback signal SF and the input signal, the feedback signal SF output from the voltage dividing circuit R based on the output voltage VOUT, and the input signal SIN being based on user operation input.

Then, when the error value VEAout is less than the above-mentioned first threshold value Vth1 (when the error value VEAout in FIGS. 2 and 3 is in the range of (1) and (2)), the control unit Y executes the regenerative control to the direct current power supply B by operating the secondary side switch M2 (cyclically turning on/off the secondary switch M2) with the primary side switch M1 turned off.

In particular, when the error value VEAout is lower than the preset second threshold Vth2 lower than the first threshold Vth1 (when the error value VEAout in FIGS. 2 and 3 is in the range of (1)), the control unit Y controls the ON width of the secondary side switch M2 to be longer as the error value VEAout is lower, and controls so that the switching period of the secondary side switch M2 is fixed.

Also, when the error value VEAout is between the preset third threshold Vth3, lower than the first threshold Vth1 and higher than the second threshold Vth2, and the second threshold Vth2 (when the error value VEAout in FIGS. 2 and 3 is in the range (2)), the control unit Y fixes the ON width of the secondary switch M2 to the minimum ON width, and controls so that the switching period of the secondary side switch M2 becomes longer as the error value VEAout becomes higher.

Therefore, regenerative control can be executed when the output voltage drops, even when the output frequency is low.

On the other hand, when the error value VEAout is higher than or equal to the above described first threshold value Vth1 (when the error value VEAout in FIGS. 2 and 3 is in the range of (4) and (5)), the control unit Y executes the normal control of the capacitive load Load by operating (periodically turning on/off) the primary side switch M1 while the secondary side switch M2 is off.

Especially, when the error value VEAout is higher than the preset fourth threshold Vth4 which is higher than the first threshold Vth1 (when the error value VEAout in FIGS. 2 and 3 is in the range of (5)), the control unit Y controls so that the ON width of the primary side switch M1 becomes longer as the error value VEAout becomes higher, and controls the switching period of the primary side switch M1 to be fixed.

Note that, when the error value VEAout is between the preset fifth threshold Vth5, lower than the fourth threshold Vth4 and higher than the first threshold Vth1, and the fourth threshold Vth4 (when the error value VEAout in FIGS. 2 and 3 is in the range of (4)), the control unit Y controls so that the ON width of the primary side switch M1 is fixed to the minimum ON width, and controls so that the switching period of the primary side switch M1 becomes longer when the error value VEAout becomes lower.

Therefore, even when the output frequency is low, normal control can be executed when the output voltage VOUT rises.

As described above, when the error value VEAout is between the third threshold value Vth3 and the fifth threshold value Vth5 (when the error value VEAout in FIGS. 2 and 3 is in the range (3)), the control unit Y controls the primary-side switch M1 and the secondary-side switch M2 so as to keep them off.

In this way, according to the control method of the inverter circuit 10, it is possible to improve the efficiency and stabilize the operation by dividing the operation between the normal control and the regenerative control, even when the output frequency is low, the normal control is executed when the output voltage rises, and the regenerative control is executed when the output voltage falls.

As described above, the inverter circuit according to one embodiment of the present invention, being a flyback regenerative control type inverter circuit for driving a capacitive load Load, the inverter circuit comprises: a first input power supply terminal TIN1 and a second input power supply terminal TIN2 to which a direct current voltage VIN is supplied from a direct current power supply B; a first output power supply terminal TOUT1 connected to one end of the capacitive load, and a second output power supply terminal TOUT2 connected to the other end of the capacitive load; a primary coil L1 having one end connected to the first input power terminal TIN1; a primary side switch M1 having one end connected to the other end of the primary side coil L1, and having the other end connected to the second input power supply terminal TIN2; a primary side rectifying element D1 having one end connected to one end of the primary side switch M1, and having the other end connected to the other end of the primary side switch M1; a secondary coil L2 having one end connected to the first output power supply terminal TOUT1, and the secondary coil L2 forming a transformer with the primary coil L1; a secondary side switch M2 having one end connected to the other end of the secondary coil L2, and having the other end connected to the second output power supply terminal TOUT2; a secondary side rectifying element D2 having one end connected to one end of the secondary side switch M2, and having the other end connected to the other end of the secondary side switch M2; a voltage dividing circuit R that outputs a feedback signal based on a divided voltage obtained by dividing an output voltage VOUT between the first output power supply terminal TOUT1 and the second output power supply terminal TOUT2; and a control unit Y that controls the primary side switch M1 and the secondary side switch M2, based on a comparison result of comparing an error value VEAout and a preset first threshold value Vth1, the error value VEAout between the feedback signal and an input signal SIN defining the target voltage of the output voltage VOUT.

In this way, according to the inverter circuit, it is possible to improve the efficiency and stabilize the operation, by dividing the operation between the normal control and the regenerative control, even when the output frequency is low, the normal control is executed when the output voltage rises, and the regenerative control is executed when the output voltage falls.

While certain embodiments have been described, these embodiments have been presented by way of example only, and are not intended to limit the scope of the inventions. The embodiments may be embodied in a variety of other forms. Furthermore, various omissions, substitutions and changes in the form of the methods and systems described herein may be made without departing from the spirit of the inventions. The embodiments and their modifications are included in the scope and the subject matter of the invention, and at the same time included in the scope of the claimed inventions and their equivalents.

EXPLANATION OF REFERENCES

100: load drive device
B: direct current power supply
Load: capacitive load
10: inverter circuit
TIN1: first input power supply terminal
TIN2: second input power supply terminal
TOUT1: first output power supply terminal
TOUT2: second output power supply terminal
L1: primary coil
M1: primary side switch
D1: Primary side rectifier
L2: secondary coil
M2: secondary switch
D2: secondary side rectifier
R: voltage dividing circuit
R1: 1st partial pressure resistance
R2: second voltage dividing resistor Y: control unit (control device)
EA: error amplifier
CN1: primary side ON width control circuit
CN2: secondary side ON width control circuit
CNF: switching period control circuit
CNK: primary/secondary switching circuit
CNS: switch cutoff circuit
G1: first logic circuit
G2: second logic circuit
FF1: first flip-flop circuit
Z: inverter element
X1: first and circuit
BA1: first buffer
FF2: second flip-flop circuit
X2: second and circuit
BA2: second buffer
VIN: direct current voltage (input voltage)
SF: feedback signal
VEAout: error value
SIN: input signal
S1: first signal
S2: second signal
S3: third signal
S4: fourth signal
S5: fifth signal
Vth1: first threshold
Vth2: second threshold
Vth3: third threshold
Vth4: fourth threshold
Vth5: fifth threshold

The invention claimed is:

1. An inverter circuit, being a flyback regenerative control type inverter circuit for driving a capacitive load, the inverter circuit comprising:
a first input power supply terminal and a second input power supply terminal to which a direct current voltage is supplied from a direct current power supply;
a first output power supply terminal connected to one end of the capacitive load, and a second output power supply terminal connected to the other end of the capacitive load;
a primary coil having one end connected to the first input power terminal;
a primary side switch having one end connected to the other end of the primary side coil, and having the other end connected to the second input power supply terminal;
a primary side rectifying element having one end connected to one end of the primary side switch, and having the other end connected to the other end of the primary side switch;
a secondary coil having one end connected to the first output power supply terminal, and the secondary coil forming a transformer with the primary coil;
a secondary side switch having one end connected to the other end of the secondary coil, and having the other end connected to the second output power supply terminal;
a secondary side rectifying element having one end connected to one end of the secondary side switch, and having the other end connected to the other end of the secondary side switch;
a voltage dividing circuit that outputs a feedback signal based on a divided voltage obtained by dividing an output voltage between the first output power supply terminal and the second output power supply terminal; and
a control unit that controls the primary side switch and the secondary side switch, based on a comparison result of comparing an error value and a preset first threshold value, the error value between the feedback signal and an input signal defining the target voltage of the output voltage.

2. The inverter circuit according to claim 1, wherein,
when the error value is greater than or equal to the first threshold value, the control unit executes a normal control of the capacitive load, by operating the primary side switch with the secondary side switch turned off, and
on the other hand, when the error value is less than the first threshold value, the control unit executes a regenerative control to the direct current power supply, by operating the secondary side switch with the primary side switch turned off.

3. The inverter circuit according to claim 2, wherein,
when the error value is lower than a preset second threshold value lower than the first threshold value, the control unit controls an ON width of the secondary side switch to become longer when the error value becomes lower, and controls so that switching period of the secondary side switch becomes fixed.

4. The inverter circuit according to claim 3, wherein,
when the error value is between a preset third threshold value, lower than the first threshold value and higher than the second threshold value, and the second threshold value, the control unit fixes the ON width of the secondary side switch to the minimum ON width, and controls so that the switching period of the secondary side switch becomes longer as the error value becomes higher.

5. The inverter circuit according to claim 4, wherein,
when the error value is higher than a preset fourth threshold value higher than the first threshold value, the control unit controls the ON width of the primary side switch to become longer when the error value becomes higher, and controls so that the switching period of the primary side switch becomes fixed.

6. The inverter circuit according to claim 5, wherein,
when the error value is between the preset fifth threshold value, higher than the first threshold value and lower than the fourth threshold value, and the fourth threshold value, the control unit controls the ON width of the primary side switch to be fixed to the minimum ON width, and controls the switching period of the primary side switch to become longer when the error value becomes lower.

7. The inverter circuit according to claim 6, wherein,
when the error value is between the third threshold value and the fifth threshold value, the control unit controls the primary side switch and the secondary side switch to be kept off.

8. The inverter circuit according to claim 2,
wherein the primary side switch is a first n-type MOS transistor having a drain which is the one end connected to the other end of the primary coil, and having a source which is the other end connected to the second input power supply terminal,
wherein the secondary switch is a second n-type MOS transistor having a drain which is the one end connected to the other end of the secondary coil and the source which is the other end connected to the second output power supply terminal,
wherein the primary side rectifying element is a first diode having a cathode connected to the one end of the primary side switch, and having an anode connected to the other end of the primary side switch, and wherein the secondary rectifying element is a second diode having a cathode connected to the one end of the secondary switch, and having an anode connected to the other end of the secondary switch.

9. The inverter circuit according to claim 1,
wherein the control unit comprises:
an error amplifier having an inverting input terminal to which the feedback signal is input, having a non-inverting input terminal to which the input signal is input, and outputting an error value between the feedback signal and the input signal;
a primary side ON width control circuit outputting a first signal that defines an ON width for operating the primary side switch, based on the error value;
a secondary side ON width control circuit outputting a second signal that defines an ON width for operating the secondary-side switch, based on the error value; and
a switching period control circuit that outputs a third signal that defines a frequency at which the primary side switch and the secondary side switch are operated, based on the error value;
wherein the control unit controls the primary side switch and the secondary side switch based on the first to third signals.

10. The inverter circuit according to claim 9,
wherein the control unit further comprises:
a primary/secondary switching circuit that outputs a fourth signal for switching one of the primary side switch and the secondary side switch to be operated, based on the error value; and
a switch cutoff circuit that outputs a fifth signal for forcibly turning off the primary side switch and the secondary side switch,
wherein the control unit controls the primary side switch and the secondary side switch based on the first to fifth signals.

11. The inverter circuit according to claim 10,
wherein the control unit further comprises:
a first logic circuit that outputs a first gate control signal for controlling the primary side switch, based on the first, third, fourth, and fifth signals; and
a second logic circuit that outputs a second gate control signal for controlling the secondary side switch, based on the second, third, fourth, and fifth signals.

12. The inverter circuit according to claim 11,
wherein the first logic circuit comprises:
a first flip-flop circuit having a set terminal to which the third signal is input, and having a reset terminal to which the first signal is input;
an inverter element to which the fourth signal is input;
a first AND circuit that receives a signal output from the output of the first flip-flop circuit, a signal output from the inverter element, and the fifth signal;
a first buffer that receives the signal output from the first AND circuit, and outputs a first gate control signal for controlling the primary side switch;
wherein the second logic circuit comprises:
a second flip-flop circuit having a set terminal to which the third signal is input and a reset terminal to which the second signal is input;
a second AND circuit that receives the signal output from the second flip-flop circuit, the fourth signal, and the fifth signal; and a second buffer that receives a signal output from the second AND circuit, and outputs a second gate control signal for controlling the secondary switch.

13. A control device applied to an inverter circuit, being a flyback regenerative control type inverter circuit for driving a capacitive load, wherein the inverter circuit comprising: a first input power supply terminal and a second input power supply terminal to which a direct current voltage is supplied from a direct current power supply; a first output power supply terminal connected to one end of the capacitive load, and a second output power supply terminal connected to the other end of the capacitive load; a primary coil having one end connected to the first input power terminal; a primary side switch having one end connected to the other end of the primary side coil, and having the other end connected to the second input power supply terminal; a primary side rectifying element having one end connected to one end of the primary side switch, and having the other end connected to the other end of the primary side switch; a secondary coil having one end connected to the first output power supply terminal, and the secondary coil forming a transformer with the primary coil; a secondary side switch having one end connected to the other end of the secondary coil, and having the other end connected to the second output power supply terminal; a secondary side rectifying element having one end connected to one end of the secondary side switch, and having the other end connected to the other end of the secondary side switch; and a voltage dividing circuit that outputs a feedback signal based on a divided voltage obtained by dividing an output voltage between the first output power supply terminal and the second output power supply terminal; and a control unit that controls the primary side switch and the secondary side switch, based on a comparison result of comparing an error value and a preset first threshold value, the error value between the feedback signal and an input signal defining the target voltage of the output voltage,
the control device controls the primary side switch and the secondary side switch, based on a comparison result of comparing an error value and a preset first threshold value, the error value between the feedback signal and an input signal defining the target voltage of the output voltage.

14. An inverter circuit control method for controlling an inverter circuit, being a flyback regenerative control type inverter circuit for driving a capacitive load, wherein the inverter circuit comprising: a first input power supply terminal and a second input power supply terminal to which a direct current voltage is supplied from a direct current power supply; a first output power supply terminal connected to one end of the capacitive load, and a second output power supply terminal connected to the other end of the capacitive load; a primary coil having one end connected to the first input power terminal; a primary side switch having one end connected to the other end of the primary side coil, and having the other end connected to the second input power supply terminal; a primary side rectifying element having one end connected to one end of the primary side switch, and having the other end connected to the other end of the primary side switch; a secondary coil having one end connected to the first output power supply terminal, and the secondary coil forming a transformer with the primary coil; a secondary side switch having one end connected to the other end of the secondary coil, and having the other end connected to the second output power supply terminal; a secondary side rectifying element having one end connected to one end of the secondary side switch, and having the other end connected to the other end of the secondary side switch; and a voltage dividing circuit that outputs a feedback signal based on a divided voltage obtained by dividing an output voltage between the first output power supply terminal and the second output power supply terminal, wherein, when the error value is greater than or equal to the first threshold value, the control unit executes a normal control of the capacitive load, by operating the primary side switch with the secondary side switch turned off, and on the other hand, when the error value is less than the first threshold value, the control unit executes a regenerative control to the direct current power supply, by operating the secondary side switch with the primary side switch turned off.

15. A load drive device, comprising:

a direct current power supply outputting a direct current voltage;

a capacitive load; and an inverter circuit, being a flyback regenerative control type inverter circuit for driving the capacitive load, wherein the inverter circuit comprises:

a first input power supply terminal and a second input power supply terminal to which the direct current voltage is supplied from the direct current power supply;

a first output power supply terminal connected to one end of the capacitive load, and a second output power supply terminal connected to the other end of the capacitive load;

a primary coil having one end connected to the first input power terminal;

a primary side switch having one end connected to the other end of the primary side coil, and having the other end connected to the second input power supply terminal;

a primary side rectifying element having one end connected to one end of the primary side switch, and having the other end connected to the other end of the primary side switch;

a secondary coil having one end connected to the first output power supply terminal, and the secondary coil forming a transformer with the primary coil;

a secondary side switch having one end connected to the other end of the secondary coil, and having the other end connected to the second output power supply terminal;

a secondary side rectifying element having one end connected to one end of the secondary side switch, and having the other end connected to the other end of the secondary side switch;

a voltage dividing circuit that outputs a feedback signal based on a divided voltage obtained by dividing an output voltage between the first output power supply terminal and the second output power supply terminal; and a control unit that controls the primary side switch and the secondary side switch, based on a comparison result of comparing an error value and a preset first threshold value, the error value between the feedback signal and an input signal defining the target voltage of the output voltage.

* * * * *